Feb. 10, 1959 — A. KONO — 2,872,843
TEST LENS HOLDER FOR EYEGLASS FRAMES
Filed May 2, 1955
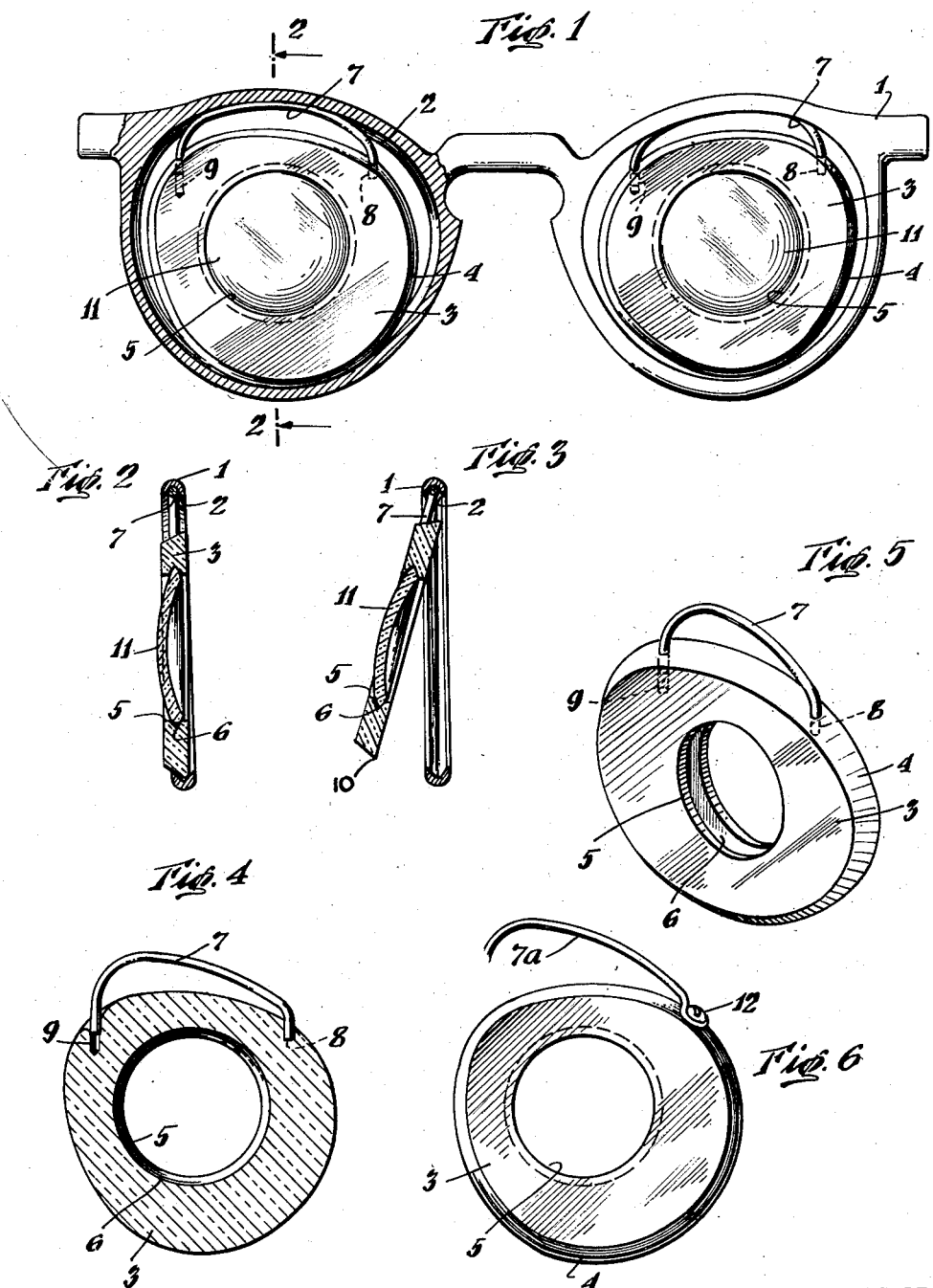
INVENTOR
ALEXANDER KONO

United States Patent Office 2,872,843
Patented Feb. 10, 1959

2,872,843

TEST LENS HOLDER FOR EYEGLASS FRAMES

Alexander Kono, Woodside, N. Y., assignor, by mesne assignments, to Kono Manufacturing Co. Inc., Woodside, N. Y., a corporation of New York Application May 2, 1955, Serial No. 505,131

2 Claims. (Cl. 88—20)

The present invention relates to an improved holder for test lenses and more particularly to a holder for test lenses whereby the holder and the test lenses may be temporarily supported within an eyeglass frame.

After a person has had his eyes examined to determine the proper corrective lenses needed, it is customary for him to be fitted for eyeglass frames of a desirable style. In order for the person with bad eyesight to select the style and shape best suited for him, it becomes necessary to have test lenses to insert into the eyeglass frames so that this person may see himself in a mirror while wearing the various styles of eyeglass frames. The conventional test lenses are smaller in size than the ordinary eyeglass lenses, necessitating that they be placed into some type of holder for insertion into the lenseless eyeglass frame. In order to procure the best possible presentation of the eyeglass frame it is important that the test lens and its holder resemble an actual eyeglass lens as much as possible.

Accordingly, an object of the present invention is to provide a simple and inexpensive test lens holder which may be easily inserted into or removed from an eyeglass frame.

Another object of the present invention is to provide a test lens holder which will be transparent and have the same appearance as the test lens so that the combination of the test lens and holder will resemble the ordinary eyeglass lens.

Other and further objects of the invention will be obvious upon an understanding of the illustrative embodiment about to be described, or will be indicated in the appended claims, and various advantages not referred to herein will occur to one skilled in the art upon employment of the invention in practice.

In describing my invention in detail, reference will be had to the accompanying drawing wherein like characters denote like or corresponding parts throughout the several figures, and in which:

Fig. 1 is a front view of an eyeglass frame showing my improved test lens holders in place. The left portion of the frame is cut away to show the lens holder in position in more detail;

Fig. 2 is a sectional view along line 2—2 of Fig. 1;

Fig. 3 is a sectional view similar to Fig. 2 and showing the manner of inserting the test lens holder into the eyeglass frame.

Fig. 4 is a front view of the test lens holder, showing the manner in which the resilient member is attached to the test lens holder;

Fig. 5 is a perspective view of the test lens holder showing the resilient means for holding the test lens in the holder; and Fig. 6 is a perspective view of the test lens holder showing an alternative means for attaching a resilient member to the test lens holder.

Referring to the drawings, Fig. 5 shows my new improved test lens holder 3 having a shape substantially similar to that of an eyeglass lens. The test lens holder 3 has a tapered edge 4. An aperture 5 is located in the center of holder 3 and it has an annular groove 6 in its sidewall. One end of resilient member or spring 7 is fixedly attached to the top of holder 3 by embedding it into the edge of the holder 3 as shown at 8. The other end of spring 7 fits loosely into aperture 9 which is formed in the edge of holder 3. As spring 7 is compressed toward the edge of holder 3 the unattached end of spring 7 will slide into aperture 9.

The test lens 11 is pressed into the aperture 5 and fits into the annular groove 6. In order to allow a test lens 11 having a diameter slightly larger than the diameter of aperture 5 to be readily pressed into place in groove 6, the lens holder 3 is preferably made of a material which is flexible and resilient compared to the lens. It is also preferable that the lens holder 3 be transparent and light in weight so that it resembles a regular eyeglass lens. One suitable material for the holder which is transparent and light in weight, and which also is flexible and resilient enough to allow the lens to be pressed easily into place is Lucite. Other suitable materials may be used.

The manner of inserting the test lens holder into the eyeglass frame is shown in Fig. 3. The spring 7 is inserted into the groove 2 of the eyeglass frame and is compressed until the edge 10 of holder 3 can be slipped into groove 2. Compressed spring 7 exerts a downward force on holder 3 so that edge 10 of holder 3 is held in place in groove 2. Spring 7 also compensates for the varying sizes of lens openings in different eyeglass frames by its resilient action. The smaller the eyeglass lens frame, the further the loose end of spring 7 will be pushed into aperture 9.

The test lens holder 3 preferably has a shape similar to but smaller than the regular eyeglass lens to permit it to be easily and rapidly inserted into and removed from the eyeglass frame. Fig. 1 shows a pair of the test lens holders inserted into an eyeglass frame.

Fig. 6 shows an alternative method of attaching spring 7a to holder 3. Spring 7a is fixedly attached to holder 3 by screw 12. The other end of spring 7a is unattached and free to slide along surface 4 under the force of compression to compensate for the varying widths of openings for lenses in different eyeglass frames.

It will be seen that the present invention provides an improved holder for test lenses which has all the appearances of an ordinarily eyeglass lens and which may be easily and efficiently inserted into and removed from an eyeglass frame.

As various changes may be made in form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A test lens holder adapted to be removably mounted in a spectacle frame comprising a transparent body portion having a peripheral edge and a lens-supporting opening therein, said opening having lens-retaining means to permit a test lens to be removably mounted therein, the zone of said body portion between said opening and said peripheral edge being solid and uninterrupted, said body portion being substantially equal in size to the size of the lens opening of a frame, said body portion having a portion of its peripheral edge slightly flattened so as to be spaced from the frame lens opening when mounted therein, and a spring on said slightly flattened portion of said peripheral edge having one end secured thereto and its other end loosely inserted in an opening therein to permit said holder to be removably inserted in said frame.

2. A test lens holder adapted to be removably mounted in a spectacle frame comprising a transparent body portion having a peripheral edge and a lens-supporting opening therein, said opening having lens-retaining means to permit a test lens to be removably mounted therein, the zone of said body portion between said opening and said peripheral edge being solid and uninterrupted, said body portion being substantially equal in size to the size of the lens opening of a frame, said body portion having a portion of its peripheral edge slightly flattened so as to be spaced from the frame lens opening when mounted therein and a spring mounted on said slightly flattened portion of said peripheral edge and having a portion protruding therefrom and flexibly engageable with the spectacle frame to permit said holder to be removably inserted in said frame.

References Cited in the file of this patent

UNITED STATES PATENTS

| | | |
|---|---|---|
| 1,128,693 | Lamb | Feb. 16, 1915 |
| 1,152,249 | Wells | Aug. 31, 1915 |
| 1,884,371 | Swart | Oct. 25, 1932 |
| 2,632,257 | Belgard | Mar. 24, 1953 |

FOREIGN PATENTS

| | | |
|---|---|---|
| 634,158 | France | Nov. 8, 1927 |
| 965,173 | France | Feb. 8, 1950 |